May 29, 1951 L. A. TROFIMOV 2,555,016
VARIABLE SPEED POWER TRANSMISSION
Filed Jan. 5, 1948 4 Sheets-Sheet 1

INVENTOR.
LEV A. TROFIMOV
BY
Harry P. Canfield
ATTORNEY

May 29, 1951 L. A. TROFIMOV 2,555,016
VARIABLE SPEED POWER TRANSMISSION
Filed Jan. 5, 1948 4 Sheets-Sheet 2

INVENTOR.
BY LEV A. TROFIMOV
Harry P. Canfield
ATTORNEY

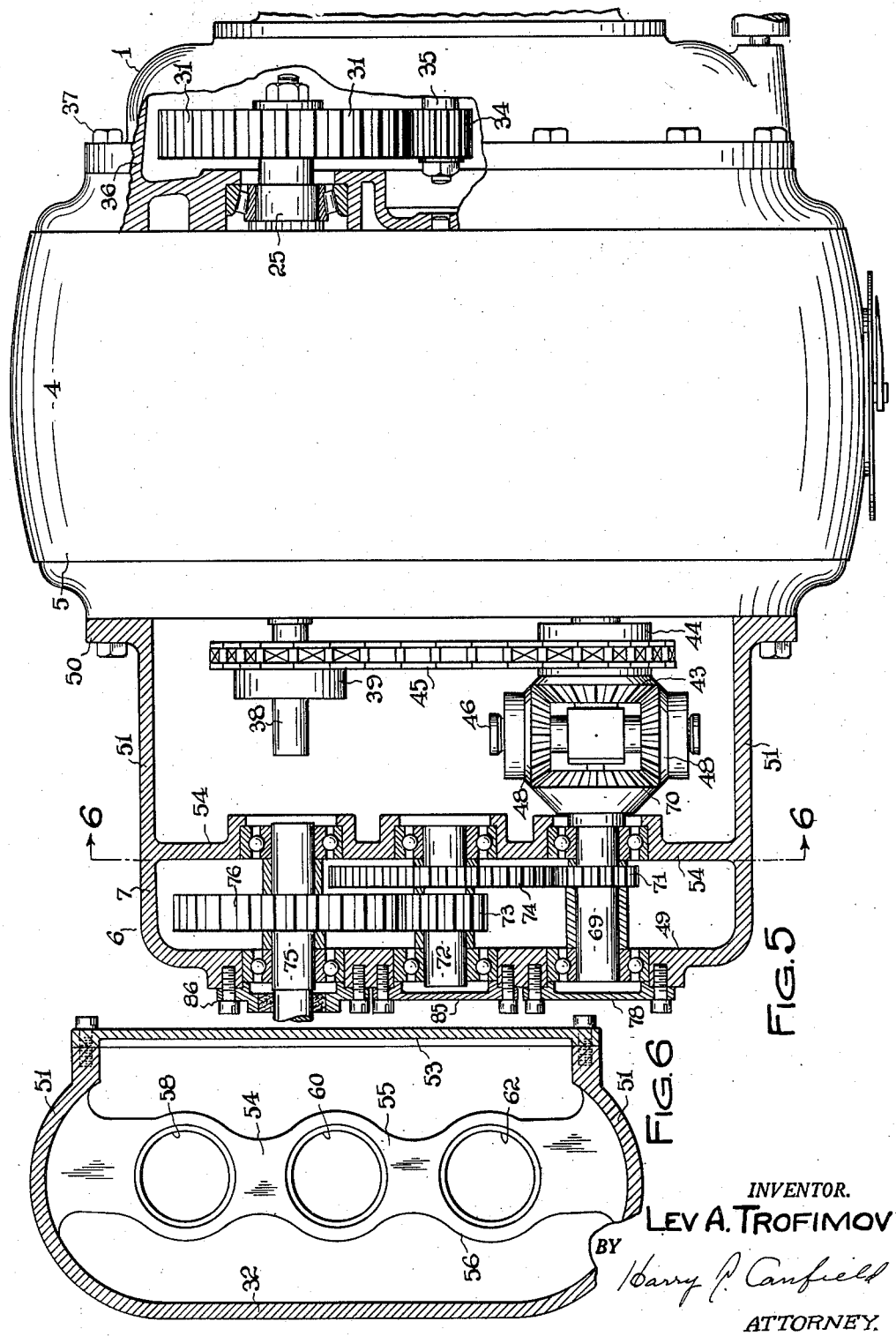

UNITED STATES PATENT OFFICE 2,555,016

VARIABLE-SPEED POWER TRANSMISSION

Lev A. Trofimov, Willoughby, Ohio

Application January 5, 1948, Serial No. 557

8 Claims. (Cl. 74—689)

This invention relates to power transmissions for transmitting power from a motor to a load to drive it at adjustably variable speeds.

In general, the transmission comprises a three element differential gearing, one element of which is driven by a continuously running motor; another element of which is connected to the load to drive it; and the third element of which has its speed adjustably controlled by a variable speed ratio transmission device between it and the motor; and the speed at which the load is driven may be adjusted from zero speed to a maximum by adjusting the speed ratio of the device.

Transmissions of this general class are known; but there is an industrial need and commercial demand for such a transmission that will be free from certain objectional features and disadvantages found in the prior transmissions.

Among such disadvantages and objectional features may be mentioned the following:

The differential gearing of the prior transmissions is noisy, because of high speeds attained by the pinions of the differential gearing. This has been overcome in the present invention by utilizing a particular type of differential gearing, one in which a spider element carrying pinions and two differential gears meshed with the pinions all have a common rotational axis; and by an arrangement of parts which causes the differential gears and the spider to all rotate in the same direction, whereby (as will appear more clearly hereinafter) the pinion speed is always low, and the intermeshed teeth of the pinions and gears in consequence rotate quietly.

Another disadvantage of prior transmissions of this class has been the loss of power in the transmission as a whole, and the resulting low efficiency. Some of this loss has been reduced in the present invention by reducing the relative speeds of tooth-engaged gears of the differential gearing as aforesaid. Another gain in efficiency has been made by connecting the differential gearing element whose speed is controlled, to the variable speed ratio device controlling it, by a sprocket chain or by spur gears (instead of through a worm gear type of connection for example as heretofore utilized), whereby the torque developed at said gearing element by reaction thereon is transmitted back to and supplements the input torque of the motor.

Another disadvantage of prior transmissions of this class has been the large overall volumetric size of the parts, and the weight thereof, prohibiting their utilization in many power applications, particularly those in which the present output speed must be maintained without any variation or with very little variation. This has been partly overcome in the present invention by utilizing a variable speed ratio device of the link-belt and expansible-wheel, positive-drive type as distinguished from variable speed-ratio transmission devices which transmit torque through frictionally engaged surfaces (of which the expansible V-pulley and V-belt type is illustrative); it having been found that in all such friction-drive variable speed ratio devices, there is load induced slippage and an unavoidable minimum of irregular creepage, at the frictionally engaged driving surfaces, and that this introduces variations in the present output speed of the transmission, which are prohibitively great in many cases, unless the friction surfaces are made unduly large so as to reduce the torque transmitted by them per square inch of surface to a very small amount.

Accordingly, a variable speed-ratio device of the friction drive type must be disproportionately large to provide the necessary large friction surfaces and this increases unduly the overall size of the transmission.

I have found, for example, that a V-belt and V-pulley variable speed ratio device for the purposes herein contemplated, and large enough to reduce the creepage or slippage aforesaid even to the minimum possible, would have to be about twice as great in volume of space occupied, as a corresponding device of the positive non-slip type comprising a link-belt, and expansible pulleys with radial teeth positively engageable by the link-belt.

In this connection it may be stated that so far as I am aware no prior motor driven transmission of this class having an output speed variable from a maximum down to zero by infinitely small steps through the agency of differential gearing and a variable speed-ratio device, has ever been proposed in which for a given motor speed and given load, the output speed is absolutely invariable; particularly at the lower output speeds approaching zero speed; and that this result is attained in the present invention.

The large size of such prior transmissions of this class has also been further reduced in the present invention by what is believed to be a novel construction of gear housing and novel arrangement of parts therein, to be more fully explained hereinafter.

Another disadvantage of prior transmissions of this class has been that the practical load-driving applications to which they are put, are of diverse character, and each transmission must be designed to adapt it to a particular installation, so that a manufacturer has to make up and stock a great variety of transmissions, or build them few at a time when called for; and this has raised unduly the cost of such transmissions.

Among such diversities of characteristics demanded in different installations, the following may be noted.

For a given motor speed, and for any given adjustment of the variable speed-ratio device, the required output speed may be very high or very low or anything in between at corresponding differences of torque.

Again, one installation may require that, as the output speed is adjustably increased, the torque must also increase. And another installation may require an increase of output torque as the adjustable speed is decreased.

In the present invention, by means of a novel construction of gear housing and arrangement of parts therein, the housing and the parts may be made and stocked in quantities at low cost, and at the time of assembly put together in various arrangements and combinations to make a transmission having the desired selected characteristics of output torque, speed, etc., which are mentioned above. By these means, a transmission is provided adaptable to a great variety of installation requirements and producible at reduced cost.

The objects of the invention are:

To provide a power transmission of the general class referred to above, in which the aforesaid, and other, objections, deficiencies, and disadvantages of prior transmissions of this class are obviated;

To provide an improved housing construction for transmissions of the aforesaid class;

To provide an improved construction of parts of a transmission of the aforesaid class, facilitating assembly thereof, and making possible assembly in different arrangements and combinations, applicable to the requirements of different installations.

Other objects will become apparent to those skilled in the art to which the invention appertains.

The invention is fully disclosed in the following description taken in connection with the accompanying drawing, in which:

Figs. 1, 2, and 3 are, respectively, top plan, side elevational and end elevational views of a transmission embodying my invention;

Fig. 5 is a view similar to Fig. 4 but with a power input gear in a different position, and with some of the parts in plan;

Fig. 6 is a sectional view from the plane 6—6 of Fig. 5 of a part of a housing of Fig. 5, with parts within the housing and parts behind the section plane omitted;

Figure 1:
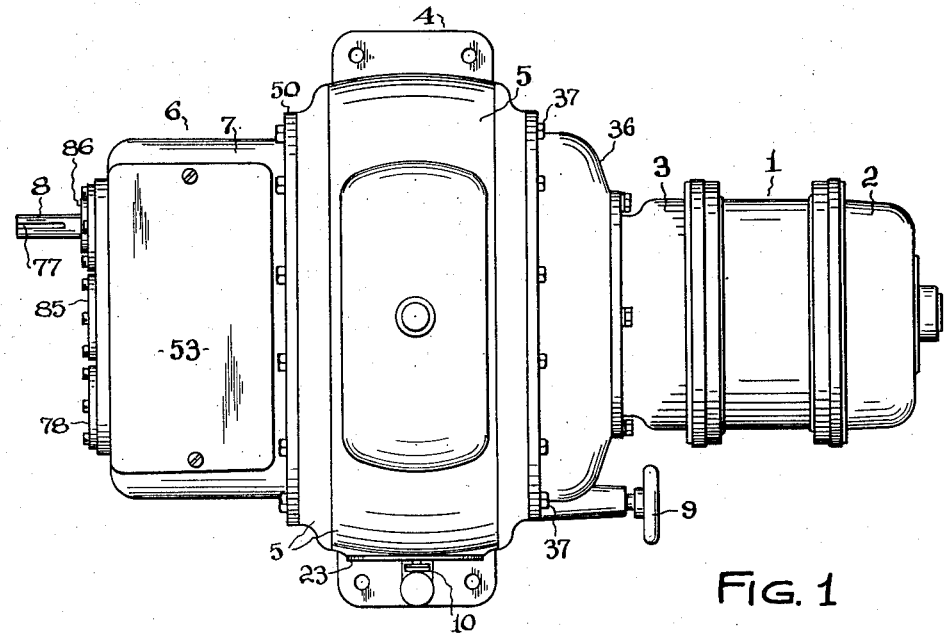

Referring to the drawing, the transmission as a whole consists of three main units, and an enclosing housing for each unit in which the parts of the unit are separately assembled.

Figure 2:
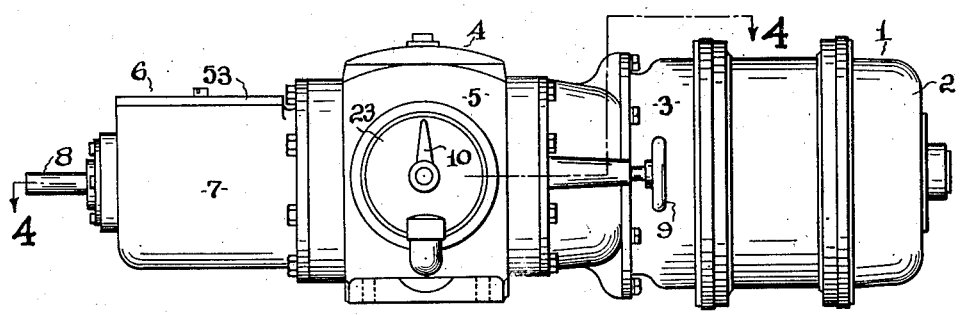
Figure 3:
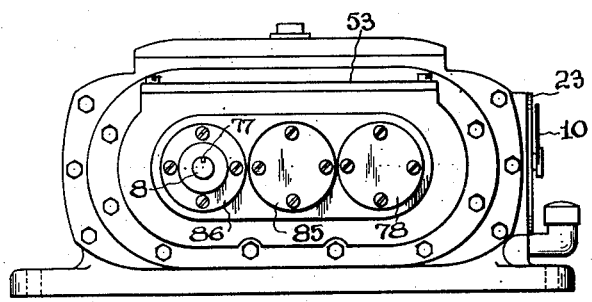

There is a power supplying unit 1, comprising a motor 2 and a housing 3, a variable speed-ratio transmission unit 4, and a housing 5; a gearing unit 6, and a housing 7. The housings are all bolted together and as shown in Figs. 1, 2, and 3 entirely enclose the apparatus except for an output shaft 8; and an adjusting handle 9 for the speed-ratio unit 4; and an adjustment indicator 10.

The variable speed-ratio transmission unit 4 assembled in the housing 5 is in the form illustrated, a known commercial device. It is generally of the more commonly axially-expansible-and-contractible V-pulley and V-belt class, but in this case is of the non-slippable-positive drive type. The pulleys 11—11 and 12—12 have radial teeth 13 on their confronting conical faces, and a chain 14 runs thereon, having teeth constructed so as to conform to and mesh with the radial teeth 13 at different diameters thereof, as the two halves of the pulleys are axially shifted toward or from each other.

Rocking levers 15 and 16 pivoted at 17—18 are simultaneously rocked in opposite directions upon rotation of a reversely threaded screw 19, meshed with nuts 20—21 on the levers, to simultaneously increase the chain-engaged diameter of one pulley and decreases that of the other.

A handle 9 is provided on the screw accessible from outside of the unit housing 5, for adjustably rotating the screw to adjustably change the ratio of the pulley diameters.

A dial finger 10 rotatable by a gear 22 meshed with the screw 19, over a dial 23 (suitably calibrated) indicates the speed ratio adjustment of the unit.

The pulleys 11—11 and 12—12 are splined upon parallel shafts 24 and 25 respectively so that each pulley drives (or is driven) by a shaft at all pulley diameters.

The housing 5 comprises opposite side walls 26 and 27 and the shafts 24—25 rotate in roller bearings 28—28 and 29—29 in these walls. The foregoing brief description of the unit 4 is believed to be sufficient in consideration of the fact that such units are well known.

The unit 4 however has special features with which the present invention is involved and these will now be described. Both of the shafts 24 and 25 extend at their opposite ends out of the housing 5, and beyond the said bearings. The shaft 24 at one projecting end, is tapered as at 30, and a gear 31 is mounted thereon by a nut 32 and key 33. The corresponding projecting end of the shaft 25 is similarly formed, so that the gear 31 may optionally be mounted on it. The gear 31 may be considered as a part of the unit 4 assembly.

The motor unit 1 has a pinion 34 on the motor shaft 35 as a part of the motor unit assembly. The motor unit housing 3 has a bell 36 extending axially around the pinion 34.

Figure 4:
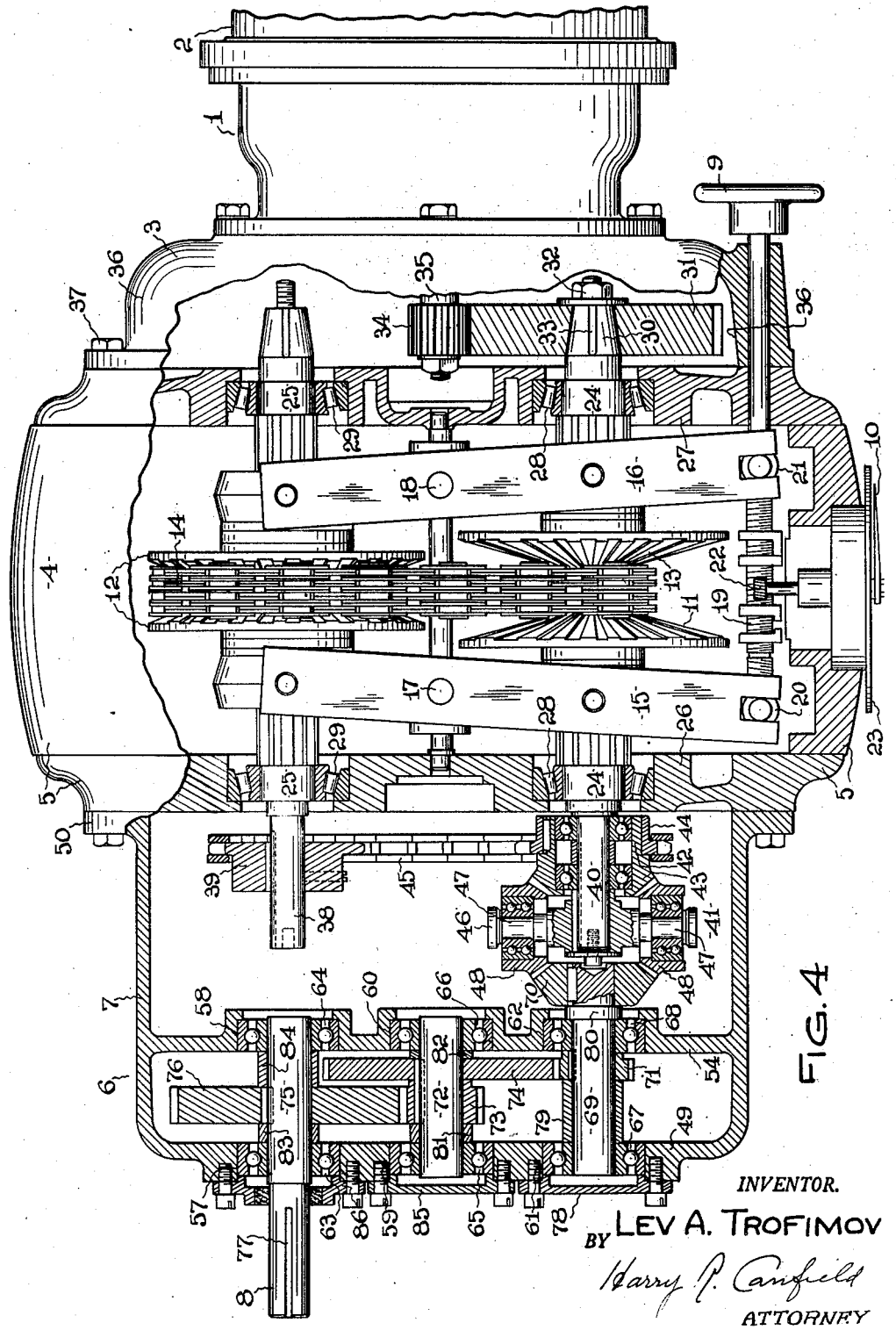
Fig. 4 is a part sectional view from the plane 4—4 of Fig. 2.

The unit housings 3 and 5 are bolted together by bolts 37, and are mutually aligned by the bolts (or by other well known means not shown) so that the motor shaft 35 is parallel to and midway between the shafts 24 and 25, and so that the pinion 34 will mesh with the gear 31 whether it is on the shaft 24 as shown in Fig. 4, or on the shaft 25 as shown in Fig. 5.

Thus at the time of mounting and securing the housing 3 upon the housing 5, the teeth of the pinion 34 move concurrently into mesh with the teeth of the gear 31; and, as predetermined by the chosen location of the gear 31, the motor will drive the shaft 24 or optionally drive the shaft 25.

The other projecting end 38 of the shaft 25 has a chain sprocket gear 39 keyed thereon to rotate therewith.

The other projecting end 40 of the shaft 24 has a sprocket gear, and part of a differential gearing shown generally at 41 mounted thereon as follows. The shaft end 40 has a pair of axially spaced ball-bearings thereon upon which rotates a tubular hub 42 of a bevel gear 43. Keyed upon the outside of the tubular hub 42 is a chain sprocket gear 44, disposed in alignment with the aforesaid sprocket gear 39. A sprocket chain 45 runs on the two sprocket gears 44 and 39.

The bevel gear 43 constitutes one of the differential gears of the differential gearing 41. The shaft end 40 projects beyond the bevel gear 43 and has keyed thereon the spider element 46 of the differential gearing 41. The spider element comprises radial arms 47—47, on which are mounted ball bearings rotatably supporting pinions 48—48, meshed with the bevel differential gear 43.

The assembled unit 4 therefore comprises, externally of its housing 5, the two chain-connected sprocket gears 39—44, and the spider element 46 and pinions 48—48 and one bevel differential gear 43 of the differential gearing 41. (The other differential gear is a part of the gearing unit 6 now to be described.)

The housing 7 of the unit 6, as shown in Figs. 4, 5, and 6 is in the form of a deep bowl, having as it does an end or bottom wall 49, and being open at the opposite end where it terminates in an external flange 50; and having opposite rounded side walls 51—51, a bottom wall 52, and a top wall 53 in the form of a cover plate 53 covering a large access opening therein and removable to give access to the interior of the bowl shaped housing to facilitate assembling parts therein or for inspection.

Spaced from the end or bottom wall 49 and preferably parallel therewith is an elongated bridging wall 54. Preferably, and as shown, the wall 54 is connected only at its opposite longitudinal ends to the side walls 51—51 of the bowl shaped housing, leaving space above and below its upper and lower edges 55 and 56 to facilitate manual assembly of parts and to effect a free "splash" lubrication of parts both to be described. The housing 7 is preferably made as a casting and the bridging wall 54 cast integral therewith.

Aligned pairs of bearing bores 57—58 and 59—60 and 61—62 are provided in the end wall 49 and bridging wall 54; and as will be apparent these may be formed in accurately aligned pairs, by tools working inwardly from outside the bottom wall.

Pairs of ball bearings 63—64 and 65—66 and 67—68 are mounted in the said pairs of bores.

A stub shaft 69 rotates in the bearing 67—68 and extends inwardly beyond the bearing 68 and has keyed thereon a bevel gear 70 which at the time of assembling the parts in the unit housing 7, is not meshed with anything.

A pinion 71 is keyed on the shaft 69 between the bearings 67—68.

An idler stub shaft 72 rotates in the bearings 65—66, and between the bearings has keyed thereto a pinion 73 and also a gear 74 which is meshed with the said pinion 71.

An output shaft has an inner end portion 75 rotating in the bearings 63—64 and has keyed thereto a gear 76 meshed with the said pinion 73; and has an outer end portion 8 projecting outwardly beyond the bearing 63 and having a keyway 77 for keying it to a load to be rotatively driven; the portion 8 being the said output shaft proper of the transmission as a whole.

The outer raceway of the ball bearing 68 bottoms in its bore 62 and the outer raceway of the ball bearing 67 is held inwardly by a cover plate 78 bolted on the outside of the housing. The pinion 71 abuts against the inner raceway of the bearing 68, and a spacer sleeve 79 is placed between the pinion 71 and inner raceway of the bearing 67. A collar 80 on the shaft 69 abuts the inner raceway of the bearing 68. The pinion 71 and bevel gear 70 are thus pre-positioned in the assembly and restrained against axial shifting.

Similarly the gear 74 and pinion 73 and shaft 72 and spacers 81 and 82 are rotatably supported by bearings 65 and 66, and held against axially shifting; and the output shaft 75, gear 76, and spacers 83 and 84 are likewise similarly mounted in the bearings 63 and 64. In each case, to assemble the parts with the corresponding shaft, the parts can be supported in position from below by one hand by reaching under the bridging wall 54 and the shaft telescoped through the parts successively by the other hand; and then the said cover plate 78, and suitable cover plates 85—86 bolted on to lock up the bearing assemblies.

The complete assembly of unit 6, includes the said gears and pinions and the bevel gear 70, the latter being one of the differential gears of the gearing 41 but not yet assembled therewith. When the housing 7 of unit 6 is mounted and bolted upon the housing 5 of unit 4, the bevel gear 70 is concurrently meshed with the pinions 48 of the gearing 41, as shown in Fig. 4 or Fig. 5, and completes the assembly of the differential gearing 41 at that time.

In any variable speed ratio transmission unit of the chain and expansible gear type (and the same is true of V-belt and expansible pulley transmissions), there are limits to the ratio-adjustment. Ratios of speeds of 1-to-2, and 2-to-1, or an overall range of 1-to-4, is well within the efficient speed-ratio range, and has been chosen here. In Fig. 4, the speed ratio of the shafts 24 and 25 is shown as adjusted to about 2-to-1.

The chain connected sprocket wheels 39 and 44 may conveniently be of the same diameter.

With the complete assembly of Fig. 4 therefore, the motor drives the shaft 24 and differential spider 46, and the spider pinions 48 react on the gear 43 and drive the gear 70 and shaft 69; the gear 43 is constrained to rotate at one half the speed of the shaft 40 and spider 46; so that the gear 70 and shaft 69 rotate at a speed one-and-one-half times that of the spider 46 this being the maximum adjustable speed. This speed is reduced (and the torque increased) through the speed change pinions and gears 71—74—73—76, and the output shaft 8 is driven at its maximum adjustable speed, and this speed may be whatever speed is desired, determined by the choice of speed change gears.

When the speed-ratio transmission is adjusted to the other extreme, the shaft 24 and sprocket driven differential gear 43, will be driven at twice the speed of the spider 46 and its pinions, and the differential gear 70 and shaft 69 will be at rest, and the output shaft 8 will have zero speed.

Taking the speed of the motor driven shaft 24 as a reference, the speed of the shaft 69 will be adjustable from one-and-one-half times that speed, to zero speed.

With this arrangement of Fig. 4, the reaction of the spider pinions 48 on the gear 43, by which they turn the gear 70, tends to turn the gear 43 in the direction in which it is constrained to rotate, and thus the torque put into it from the spider, is transmitted through the sprocket chain 45, to the shaft 25 and thence through the main chain 14 to the shaft 24 and in the same direction as the motor torque in the shaft 24. The power represented by the torque and speed of the gear 43 in controlling the output speed is thus not lost but is put back into the system as useful power by being applied to the shaft 24 which puts power into the system.

In Fig. 5, with the same parts as in Fig. 4, but with the gear 31 assembled with the shaft 25 the gear 43 of the gearing 41 is driven at constant speed by the motor through the sprocket chain 45 and sprockets 39—44, and the spider 46 is constrained to rotate at adjustably variable speed by the variable speed ratio unit; and the differential gear 43 rotates the spider pinions 48 and they react on the rotating spider and rotate the gear 70 and shaft 69.

The power represented by the torque and speed at the spider is, here also, put back into the system at the shaft 40—24.

Over the whole said range of adjustment referred to, and taking the speed of the motor driven shaft as a reference, the speed of the shaft 69 will be adjustable from three times that speed, to zero speed.

The maximum load which can be put upon the output shaft 8, will be determined by the maximum torque which it is permissible to transmit by the chain 14 and expansible gear wheels 11 and 12 at the different diameters thereof in the aforesaid range of adjustments; and for a given size or horsepower rating of the variable speed ratio device.

From the foregoing considerations, it will now be apparent that the construction above described makes possible great economy in manufacturing the transmission, to fill a great diversity of specifications imposed by the purchaser.

Units 1 and 4 can be made up separately, completely assembled, and stocked in quantities. At the time of assembling them together the gear 31 can be put on either shaft 24 or shaft 25.

As to unit 6, the housing 7, and the individual parts to go therein can be made up in quantities. At the time of assembling the unit, the desired change gears can be selected for speed step up or step down.

The choice of a great diversity of possible assemblies is made at the time of assembly, to provide a complete transmission the output shaft of which will have the desired adjustable speed range from zero to maximum, with corresponding torques; and adapted to loads whose torques rise with speed, or, decrease with speed.

In some cases, conditions at an installation make it advantageous to take power out at the axis of the shaft 69 (instead of 75). To this end, preferably, and as shown in the drawing, the bearings, the diameters, etc. of shafts 75 and 69 are made alike so that these shafts are interchangeable in position. Correspondingly, the shaft portions 38 and 40 are made identical so that the differential gearing parts 43—47—48 can be changed over from the shaft 40 to the shaft 38; and the sprocket 39 changed over to the shaft 40. The motor driven gear 31 as before can be mounted on the shaft 25 (and then will drive directly the differential spider 47) or mounted on the shaft 24 (and then will drive directly the sprocket 39). The operative results will all be the same as when power is taken out at the axis of shaft 75 as now in Fig. 4 or Fig. 5.

Shafts 75 and 69 being thus made interchangeable, it is desirable to be able to use the same stock and variety of speed change gears therebetween for both interchanged cases; and to this end, the bearing axis of shaft 72 is placed accurately midway between the bearing axis of shafts 75 and 69.

Thus there are advantages in having a symmetrical and balanced pattern arrangement for the shafts, namely: shafts 75 and 38 axially aligned; shafts 69 and 40 axially aligned; shaft 72 midway between shafts 75 and 69. And a further advantage of this balance and symmetry will now be described with reference to Fig. 7.

Figure 7:
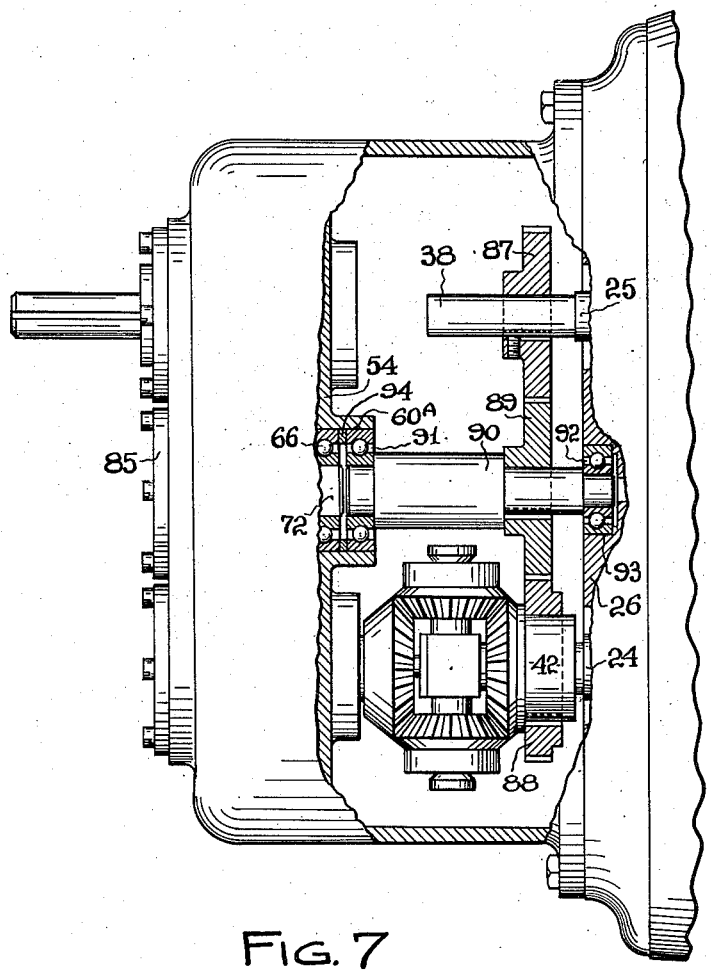
Fig. 7 is a view in simplified form of a part of Fig. 4 illustrating a modification.

In Figs. 4 and 5, the positive interconnection between the shaft 25 and the differential gear 43 on the axis of the shaft 24, is effected by a chain 45 and sprockets 39—44. In Fig. 7 is shown a modification of this interconnection utilizing meshed gears, and which will often be preferred.

A gear 87 is secured to the shaft end 38 (in place of the sprocket 39 of Fig. 4); a gear 88 is secured on the hub 42 (in place of the sprocket 44 of Fig. 4); and both gears are meshed with an intermediate idler gear 89, secured to a stub shaft 90 supported at its end by ball bearings 91 and 92.

For reasons already referred to, it is desirable (but not essential) for the gears 87 and 88 to rotate at the same speed and therefore to be of the same diameter. To this end, the axis of the bearings 91 and 92 will be in a vertical plane midway between the axes of the gears 87 and 88 and for suitable diameters of gears 87—88 and 89, the axis of the bearings 91 and 92 will coincide with the axis of the shaft 72. The bearing 91 is supported by the bridging wall 54; and caused to be in axial alignment with the bearing 66 in the wall 54 by simply making the bore 60 (already described for the bearing 66 of the shaft 72) axially longer as at 60A Fig. 7 to accommodate the outer races of both bearings 66 and 91. The outer raceway of bearing 92 is seated in a recess 93 formed in the housing wall 26 in axial alignment with the bearing bore 60A. A spacing ring 94 is placed between the outer raceways of the bearings 66 and 91 so that all end play is taken up all the way from the cover plate 85 to the bottom of the recess 93 through the axially aligned bearings 65, 66, 91, 92, and shafts 72 and 90.

In some cases, the output shaft 8 may be an extension of the shaft 72 with only a single speed reduction as for example by gears 71 and 74. In other cases, the output shaft 8 may be an extension of the shaft 69 without any speed change gears. In any case, the speed change gears when used may be speed increasing or speed decreasing gears as will be understood.

All of the gears in the housing 7 can be lubricated by splash lubrication in a well known manner, the bridging character of the wall 54 allowing for free circulation of lubricant over all bearing parts.

The invention may be practiced by embodiments thereof differing from the exact construction illustrated and described, and the invention comprehends all changes and modifications which may be made therein, that come within the scope of the appended claims.

I claim:

1. In a power transmission mechanism a first separately assembled unit comprising a first housing containing a variable speed-ratio device, having an input shaft adapted to be connected to a driving motor, and a driven shaft parallel thereto; both shafts having end portions projecting in the same direction from the housing; a first one of said shaft end portions having rotatable therewith a differential gearing spider element rotatably supporting differential pinions; and having rotatable therearound a first differential gear meshed with the pinions and a first toothed-element rotatable with the differential gear; the second one of said shaft end portions having rotatable therewith a second toothed element; transmission means interconnecting the two toothed elements; a second separately assembled unit comprising a second housing rotatably supporting a plurality of shafts in parallel relation; intermeshed gears of different diameter interconnecting the shafts; one shaft projecting from the housing as a power output shaft; another shaft extending oppositely thereto and having rotatable therewith a second differential gear; the first and second housings being provided with means to predeterminedly position one upon the other and connect them together to unite the two units in a complete transmission mechanism, and when so positioned and attached, said means disposing the first said shaft projecting end portion in axial alignment with the said second differential gear and disposing the differential pinions in meshed relation therewith.

2. In a power transmission two separately assembled units each comprising a housing; one housing containing a variable speed-ratio device comprising a rotary power input element, and a rotary adjustably variable speed power output element, and also rotatably supporting the spider element and the pinions rotatably supported thereby and one of the two differential gears meshed with the pinions, constituting a differential gearing of the transmission; the spider element and said one differential gear having driving connection with the two said power elements respectively; the other housing rotatably supporting the other differential gear of the differential gearing, and an output shaft drivingly connected thereto; the two housings constructed to be predeterminedly positioned one upon the other and secured together by bolts or like attaching devices to join the two units in a complete transmission mechanism; and when so positioned and secured disposing the said other differential gear of the gearing to mesh with the pinions to complete the said differential gearing assembly and to effect coupling of the rotary power input element to the output shaft through the differential gearing and variable speed ratio device.

3. In a power transmission comprising a differential gearing having three elements, namely, a spider element rotatably supporting a pinion and two differential gears meshed with the pinion, two separately assembled units each comprising a housing; one housing containing a variable speed-ratio device comprising a rotary power input element, and a rotary adjustably variable speed power output element, and also rotatably supporting two of the elements of said differential gearing of the transmission, different ones of the two elements of the gearing having driving connection with the two said power elements respectively; the other housing being of bowl-form having a plurality of laterally spaced axially parallel bearing bores in the bowl bottom wall and having an elongated transverse bridge-wall spaced from the bottom wall connected at its opposite ends to opposite walls of the bowl-form and between its ends being laterally spaced from the bowl walls; and the bridge wall having therein a plurality of laterally spaced bearing bores axially aligned in pairs with corresponding bowl bottom bores; one pair of said pairs of bores rotatably supporting a shaft carrying the remaining element of said differential gearing, and another of said pairs of bores rotatably supporting an output shaft driven by said first shaft; the two housings constructed to be predeterminedly positioned one upon the other and secured together by bolts or like detachable devices to join the two units in a complete transmission mechanism, and when so positioned and secured, disposing the said third differential gearing element to complete the said differential gearing to effect coupling of the rotary power input element to the output shaft through the differential gearing and variable speed ratio device.

4. In a power transmission mechanism comprising a differential gearing having three elements, namely, a spider element rotatably supporting a pinion and two differential gears meshed with the pinion, a first separately assembled unit comprising a first housing containing a variable speed-ratio device, having an input shaft adapted to be connected to a driving motor, and a driven shaft parallel thereto; both shafts having end portions projecting in the same direction from the housing; a first one of said shaft end portions having rotatable therewith one of the rotary elements of said differential gearing of the transmission and having rotatable therearound another of the differential gearing elements; a first transmission gear rotatable with the said other differential gearing element; the second one of said shaft end portions having rotatable therewith a second transmission gear; an intermediate idler gear meshed with both said first and second gears and having an idler gear shaft one end of which has a bearing on the first housing; a second separately assembled unit comprising a second housing rotatably supporting three shafts in parallel relation, with their axes equally spaced apart; intermeshed gears of different diameters interconnecting the three shafts; a first outer one of the three shafts projecting from the housing as a power output shaft; the second outer one of the three shafts extending oppositely to the first outer one and having connected thereto, the third element of the differential gearing; the first and second housings being provided with means to predeterminedly position one upon the other and connect them together to join the two units into a complete transmission mechanism; and when so positioned and attached disposing the output shaft in axial alignment with the second said shaft projecting end portion, and disposing the shaft that is connected to the third differential gearing element in axial alignment with the first said shaft projecting end portion and completing the assembly of the differential gearing; and disposing the intermediate one of said three shafts in axial alignment with the intermediate idler gear; and supporting the other end of the idler gear shaft on a bearing on the second housing.

5. In a power transmission mechanism comprising a differential gearing having three elements, namely, a spider element rotatably supporting a pinion and two differential gears meshed with the pinion, a first separately assembled unit comprising a first housing containing a variable speed-ratio device, having an input shaft adapted to be connected to a driving motor, and a driven shaft parallel thereto; both shafts having end portions projecting in the same direction from the housing; a first one of said shaft end portions having rotatable therewith one of the rotary elements of said differential gearing of the transmission and having rotatable therearound another of the differential gearing elements; a first transmission gear rotatable with the said other differential gearing element; the second one of said shaft end portions having rotatable therewith a second transmission gear; transmission means drivingly interconnecting said first and second transmission gears; a second separately assembled unit comprising a second housing rotatably supporting three shafts in parallel relation, with their axes equally spaced apart; intermeshed gears of different diameters interconnecting the three shafts; a first outer one of the three shafts projecting from the housing as a power output shaft; the second outer one of the three shafts extending oppositely to the first outer one and having connected thereto, the third differential gearing element; the first and second housings being provided with means to predeterminedly position one upon the other and connect them together to join the two units into a complete transmission mechanism; and when so positioned and attached disposing the output shaft in axial alignment with the second said shaft projecting end portion, and disposing the shaft that is connected to the third differential gearing element in axial alignment with the first said shaft projecting end portion and completing the assembly of the differential gearing.

6. In a power transmission mechanism comprising a differential gearing having three elements, namely, a spider element rotatably supporting a pinion and two differential gears meshed with the pinion, a first separately assembled unit comprising a first housing containing a variable speed-ratio device, having an input shaft adapted to be connected to a driving motor, and a driven shaft parallel thereto; both shafts having end portions projecting in the same direction from the housing; a first one of said shaft end portions having rotatable therewith one of the elements of said differential gearing of the transmission; and having rotatable therearound another of the elements of the gearing and a first toothed-element rotatable with the said other differential gearing element; the second one of said shaft end portions having rotatable therewith a second toothed element; transmission means drivingly interconnecting the two toothed elements; a second separately assembled unit comprising a second housing rotatably supporting a plurality of shafts in parallel relation; intermeshed gears of different diameters interconnecting the shafts; one shaft projecting from the housing as a power output shaft; another shaft extending oppositely thereto and having rotatable therewith the third element of the differential gearing; the first and second housings being provided with means to predeterminedly position one upon the other and connect them together to unite the two units in a complete transmission mechanism, and, when so positioned and attached, the first said shaft projecting end portion being disposed in axial alignment with the third differential gearing element and completing the assembly of the differential gearing.

7. In a power transmission comprising a differential gearing having three elements, namely, a spider element rotatably supporting a pinion and two differential gears meshed with the pinion, three separately assembled units each comprising a housing; a first housing containing power input and output rotatably supported shafts connected by a variable speed-ratio transmission, and each shaft having two end portions projecting in opposite directions; and the housing rotatably supporting two of the elements of a said differential gearing of the transmission, said two elements of the gearing drivingly connected to corresponding end portions of the respective shafts; the input and output shafts at their other ends adapted to have a power input gear mounted on one or the other selectively; a second housing rotatably supporting the third element of the said differential gearing and an output shaft drivingly connected thereto; the two housings constructed to be predeterminedly positioned one upon the other and secured together by bolts or like attaching devices, to join the two units in a complete transmission mechanism, and when so positioned and secured, disposing the said third gearing element to complete the said differential gearing assembly and to effect coupling of the rotary power input shaft to the output shaft through the differential gearing and variable speed ratio device; the third housing containing a power supplying motor having an output pinion and the third housing constructed to be predeterminedly positioned on and secured to the first housing by bolts or like attaching devices and when so positioned and secured disposing the motor pinion midway between the said other ends of the input and output shafts whereby it may be drivingly coupled with said power input gear in either said selected position thereof.

8. In a power transmission mechanism comprising a differential gearing having three elements, namely, a spider element rotatably supporting a pinion and two differential gears meshed with the pinion, two separately assembled units each comprising a housing, one housing rotatably supporting a rotary power input element and the spider element and pinions rotatably supported thereby and one of the two differential gears meshed with the pinions of said differential gearing of the transmission, and the one differential gear having a driving connection with the rotary power input element; the other housing rotatably supporting the other differential gear of the gearing; the two housings constructed to be predeterminedly positioned one upon the other and secured together by bolts or like attaching devices to join the two housings, and when so positioned and secured disposing the said other differential gear element of the gearing to mesh with the pinions to complete the differential gearing assembly.

LEV A. TROFIMOV.

REFERENCES CITED

The following references are of record in the file of this patent:

UNITED STATES PATENTS

| Number | Name | Date |
|---|---|---|
| 795,386 | Cutter | July 25, 1905 |
| 1,031,988 | Draullette | July 9, 1912 |
| 1,392,567 | Horine | Oct. 4, 1921 |
| 1,702,627 | Bronander | Feb. 19, 1929 |
| 1,906,831 | Baker et al. | May 2, 1933 |
| 1,909,626 | Nilsson | May 16, 1933 |
| 2,161,894 | Bishop | June 13, 1939 |
| 2,164,818 | Heyer et al. | July 4, 1939 |
| 2,270,980 | Tidball | Jan. 27, 1942 |
| 2,392,149 | Hornbostel | Jan. 1, 1946 |

FOREIGN PATENTS

| Number | Country | Date |
|---|---|---|
| 599,612 | Germany | July 5, 1934 |